United States Patent [19]
Costales

[11] Patent Number: 5,644,850
[45] Date of Patent: Jul. 8, 1997

[54] LASER PLUMB DEVICE

[76] Inventor: Straf G. Costales, 2117 Komo Mai Dr., Pearl City, Hi. 96782

[21] Appl. No.: 543,399

[22] Filed: Oct. 16, 1995

[51] Int. Cl.$^6$ .................................................. G01C 15/00
[52] U.S. Cl. ...................... 33/282; 33/286; 33/299; 33/DIG. 21
[58] Field of Search ................................ 33/290, 276, 282, 33/283, 299, 286, DIG. 21

[56] References Cited

U.S. PATENT DOCUMENTS

| | | | |
|---|---|---|---|
| 3,471,234 | 10/1969 | Studebaker | 33/DIG. 21 |
| 3,635,565 | 1/1972 | Colsom . | |
| 3,911,588 | 10/1975 | Ohneda | 33/286 |
| 4,106,207 | 8/1978 | Boyett et al. . | |
| 4,878,296 | 11/1989 | Londino, Jr. | 33/286 |
| 5,012,585 | 5/1991 | DiMaggio | 33/286 |
| 5,163,229 | 11/1992 | Cantone . | |
| 5,218,770 | 6/1993 | Toga | 33/276 |
| 5,367,779 | 11/1994 | Leo . | |
| 5,501,018 | 3/1996 | Porter | 33/290 |

FOREIGN PATENT DOCUMENTS

| | | | |
|---|---|---|---|
| 3084441 | 4/1991 | Japan | 33/276 |
| 679425 | 2/1992 | Switzerland | 33/644 |

*Primary Examiner*—Thomas B. Will
*Attorney, Agent, or Firm*—Michael I. Kroll

[57] ABSTRACT

A laser plumb device (10) comprising a facility (12) for emitting two narrow light beams (A) and (B) in which the light beams (A) and (B) are opposite and aligned to each other. A structure (14) is for supporting the light emitting facility (12) in a vertical position. When the supporting structure (14) is placed over a layout mark (16) upon a floor (18) under a ceiling (20) in a building (22), the light emitting facility (12) will cast the first narrow light beam (A) onto the layout mark (16) upon the floor (18) and will simultaneously cast the second narrow light beam (B) onto the ceiling (20) to transfer the layout mark (16) from the floor (18) to the ceiling (20).

1 Claim, 2 Drawing Sheets

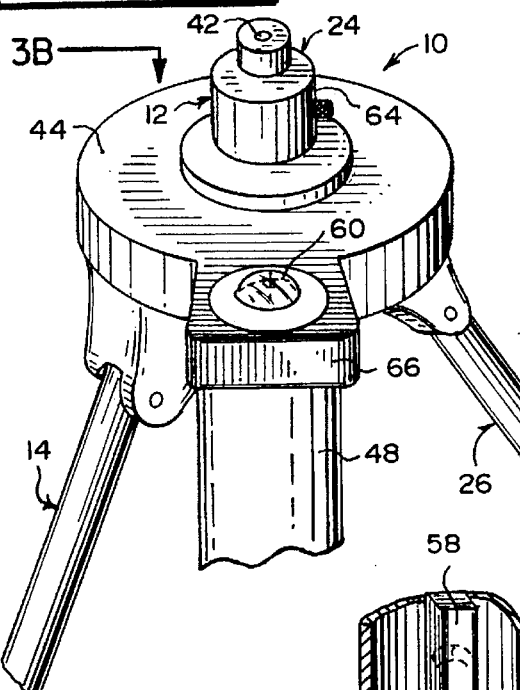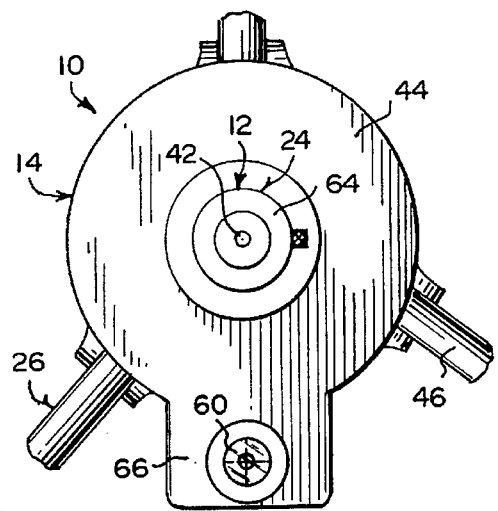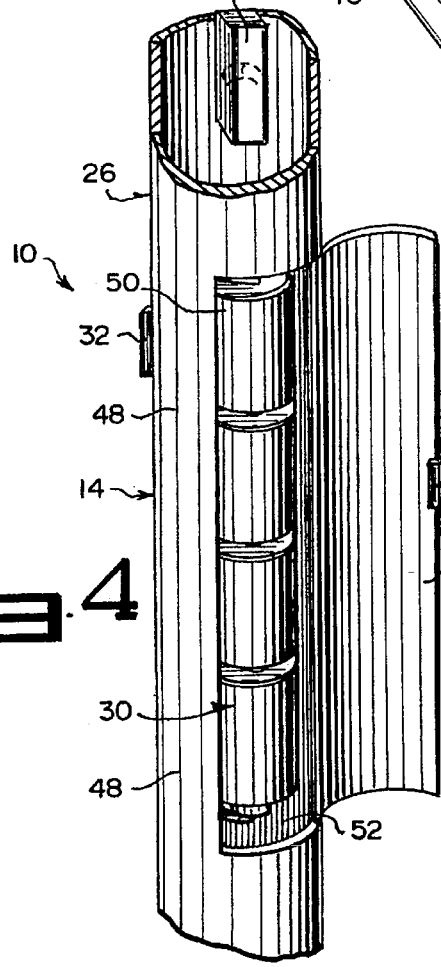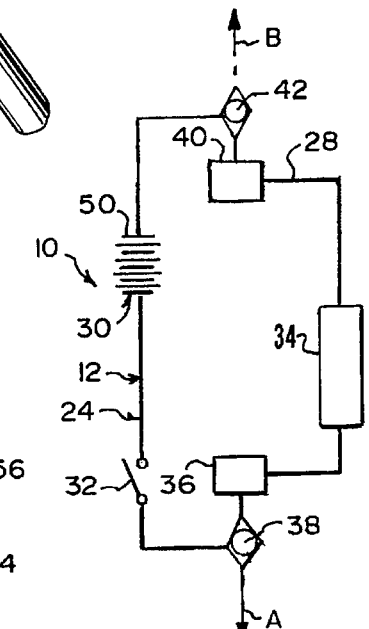

LASER PLUMB DEVICE

BACKGROUND OF THE INVENTION

1. Field of the Invention

The instant invention relates generally to vertical leveling markers and more specifically it relates to a laser plumb device.

2. Description of the Prior Art

Numerous vertical leveling markers have been provided in prior art. For example, U.S. patents numbered U.S. Pat. No. 3,635,565 to Colson; U.S. Pat. No. 4,106,207 to Boyett et al.; U.S. Pat. No. 5,163,229 to Cantone and U.S. Pat. No. 5,367,779 to Lee all are illustrative of such prior art. While these units may be suitable for the particular purpose to which they address, they would not be as suitable for the purposes of the present invention as heretofore described.

COLSON, GEORGE P.

LASER VERTICAL COLLIMATOR

U.S. Pat. Number 3,635,565

To establish as a plumb reference line for construction of buildings or shafts a laser beam is used. A laser source is mounted in a tube, the upper end of the tube is supported so that the weight of the tube and the laser source makes the tube assume a vertical position. The support may be mounted on a tripod or side support. For shafts, the laser beam is directed downward. For buildings, the source may be reversed in the tube to be directed upward.

BOYETTE, VERNON HUGO

DEVINE, ROBERT W.

POINT TO POINT SELF-LEVELING PLUMBING DEVICE

U.S. Pat. No. 4,106,207

A tubular aluminum housing, having vertically centered pinpoint light bulbs at either end in nose cones, is suspended on a stand by a gimbal system, and has an on-off switch and batteries such that the light bulbs will emit aligned light beams above and below the housing. The nose cones are threaded onto the housing such that they can be moved upwardly and downwardly for focusing of the light beams. Colluminator and magnifying lenses are contained in the nose cones for magnification and additional focusing. A wind shield is disposed on the stand around the housing.

CANTONE, GIOVANNI F.

PLUMB AND HORIZONTAL LOCATING DEVICE

U.S. Pat. No. 5,163,229

A device is disclosed for accurately and precisely locating specific points on ceilings or, alternatively, on the same horizontal plane. A light emitting means, a pendulum, a support, and two cylindrical rods act in concert to provide a light beam that is always plumb or always horizontally level.

LEE, ROGER

LASER MARKER

U.S. Pat. No. 5,367,779

A laser marker which includes a casing having a battery chamber covered by a lid. A level bearing plate is fastened to the casing at the bottom. A level is mounted on the level bearing plate above the casing. An adjustment rack is pivotably fastened to the casing by two spring-supported locating plates. Two axle caps are to hold a light concentrator. A rotary socket covered by a lens cover is to hold a lens in line with the light concentrator. The adjustment rack is turned on the casing and retained in the desired angle by the locating plates. The rotary socket is turned on the adjustment rack to let the light of the light concentrator be emitted through the lens and formed into a light spot or a line of light projected on an object.

SUMMARY OF THE INVENTION

A primary object of the present invention is to provide a laser plumb device that will overcome the shortcomings of the prior art devices.

Another object is to provide a laser plumb device that uses laser light beams to transfer layout marks from a floor onto a ceiling.

An additional object is to provide a laser plumb device that uses a tripod assembly with bubble levels in combination with two laser pointers mounted thereon to accomplish the transfer of the layout marks from the floor onto the ceiling.

A further object is to provide a laser plumb device that is simple and easy to use.

A still further object is to provide a laser plumb device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3A is an enlarged perspective view similar to FIG. 2, showing a modification in which the round bubble level is mounted into a horizontal extension portion of the top platform.

FIG. 3B is a top view taken in the direction of arrow 3B in FIG. 3A.

FIG. 4 is a further enlarged perspective view of a portion of the center post as indicated by arrow 4 in FIG. 2, showing a door of a battery compartment opened.

FIG. 5 is a diagrammatic schematic view of the laser electrical circuit.

Similar reference characters denote corresponding features consistently throughout the attached drawings.

DETAILED DESCRIPTION OF THE PREFERRED EMBODIMENTS

Figure 1:
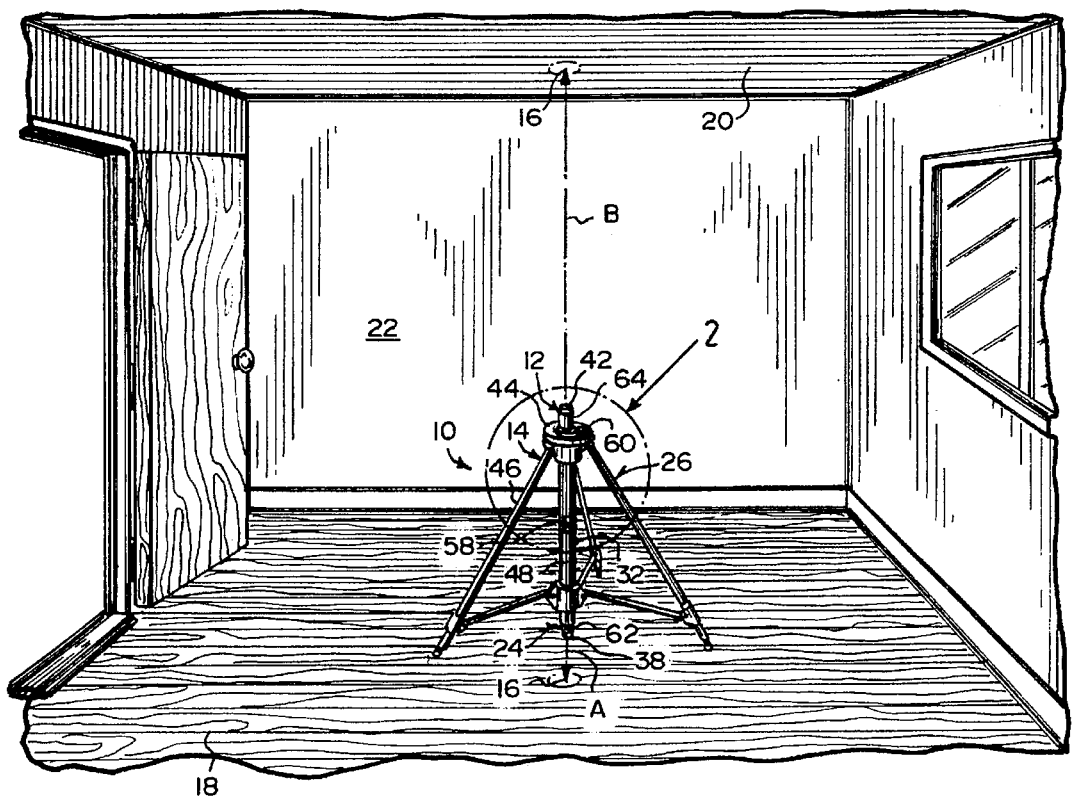
FIG. 1 is a perspective view, showing the instant invention in use transferring layout marks from a floor onto a ceiling in a building, with laser light beams.
Figure 2:
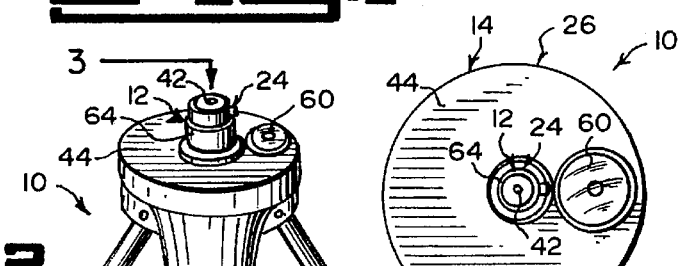
FIG. 2 is an enlarged perspective view of a portion of FIG. 1 as indicated by arrow 2 in FIG. 1.
Figure 3:
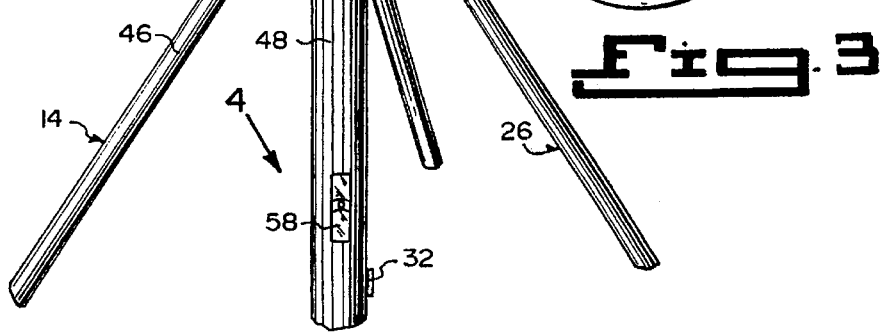
FIG. 3 is a top view taken in the direction of arrow 3 in FIG. 2, with the adjustable legs broken away.

Turning now descriptively to the drawings, in which similar reference characters denote similar elements throughout the several views, FIGS. 1 through 5 illustrate a laser plumb device 10, comprising a facility 12 for emitting two narrow light beams A and B, in which the light beams A and B are opposite and aligned to each other.

A structure 14 is for supporting the light emitting facility 12 in a vertical position. When the supporting structure 14 is placed over a layout mark 16 upon a floor 18 under a ceiling 20 in a building 22, the light emitting facility 12 will cast the first narrow light beam A onto the layout mark 16 upon the floor 18 and will simultaneously cast the second narrow light beam B onto the ceiling 20, to transfer the layout mark 16 from the floor 18 to the ceiling 20. The light emitting facility is a dual laser unit 24. The supporting means structure 14 is a tripod 26.

The dual laser unit 24, as best seen in FIG. 5, includes an electrical circuit 28. A power source 30 is connected to the electrical circuit 28. An on/off switch 32 is connected to the electrical circuit 28. A ballast 34 is connected to the electrical circuit 28.

A first laser generator 36 is connected to the electrical circuit 28. A first laser light concentrator 38 is connected to the electrical circuit 28, for producing the first narrow light beam A. A second laser generator 40 is connected to the electrical circuit 28. A second laser light concentrator 42 is connected to the electrical circuit 28, for producing the second narrow light beam B.

The tripod 26 contains a disk shaped platform 44. Three adjustable legs 46 are hinged to and extend from the disk shaped platform 44. A center post 48 is suspended down from the disk shaped platform 44. The light emitting facility 12 is mounted within the center post 48 and up through the disk shaped platform 44. The first narrow light beam A will exit from the bottom of the center post 48, while the second narrow light beam B will exit from the top of the disk shaped platform 44.

The power source 30 is at least one battery 50 or a plurality of batteries, as shown in FIG. 4. The center post 48 has a side open compartment 52, for storing the power source 30 therein, which is the at least one battery 50. A curved door 54 is hinged to the center post 48 at the side open compartment 52. A latch 56 on the curved door 54 is for keeping the curved door 54 closed on the center post 48. The on/off switch 32 of the dual laser unit 24 is supported on the center post 48.

The tripod 26 further includes a vertical bubble level 58, mounted into the center post 48. A round bubble level 60 is mounted onto the disk shaped platform 44. The levels 58 and 60 will be used to keep the tripod 26 level and the light emitting facility 12 in a true vertical position.

The light emitting facility 12 contains a first adjustment head 62 for the first laser light concentrator 38, so as to focus the first narrow light beam A onto the layout mark 16 upon the floor 18. A second adjustment head 64 is for the second laser light concentrator 42, so as to focus the second narrow light beam B onto the ceiling 20.

As shown in FIGS. 3A and 3B, the disk shaped platform 44 includes a horizontal extension portion 66, in which the round bubble level 60 is mounted onto, so as to better place the tripod 26 into the true vertical position.

OPERATION OF THE INVENTION

To use the laser plumb device 10, the following steps should be taken:

1. Place the tripod 26 over the layout mark 16 on the floor 18.
2. Adjust the legs 46 so that the center post 48 is vertical.
3. Check the vertical bubble level 58 on the center post 48 and the round bubble level 60 on the disk shaped platform 44, to make sure that the center post is exactly vertical.
4. Turn the switch 32 on so that the first narrow light beam A will be cast onto the layout mark 16 upon the floor 18 and the second narrow light beam B will be cast onto the ceiling 20.
5. Adjust the first adjustment head 62 on the first laser light concentrator 38 to focus the first narrow light beam A.
6. Adjust the second adjustment head 64 on the second laser light concentrator 42 to focus the second narrow light beam B.
7. The transfer of the layout mark 16 from floor 18 to the ceiling 20 will now be complete.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A laser plumb device for transferring a layout point on a floor to an overhead ceiling comprising:
    a) means comprising a dual laser unit for emitting first and second narrow light beams in which the light beams are opposite and aligned to each other;
    b) means for supporting said light emitting means in a vertical position comprising a tripod having a disk shaped platform three adjustable legs hinged to and extending from said disk shaped platform, and a center post suspended down from and rigidly attached to said disk shaped platform, said light emitting means being mounted within said center post and extending up through said platform, and said disk shaped platform including a horizontal extension portion, so that when said supporting means is placed over a layout mark upon a floor under a ceiling in a building, said light emitting means will cast the first narrow light beam onto the layout mark upon the floor and will simultaneously cast the second narrow light beam onto the ceiling to transfer the layout mark from the floor to the ceiling;
    c) said dual laser unit comprising a first laser generator having a first laser light concentrator for producing a first narrow light beam, a second laser light generator having a second laser light concentrator for producing the second narrow light beam, said first and second laser generators and first and second light concentrators being arranged along a vertical axis, and first and second adjustment heads to said first and second laser light concentrators, respectively, so as to focus the first and second narrow light beams onto the layout market on the floor and on the ceiling, respectively;

d) means for placing said center post in a vertical position comprising a vertical bubble mounted in the side of said center post and a round bubble level mounted in the top surface of said platform on said horizontal extension portion; and e) power supply means for said laser light generators comprising a side open compartment formed in said center post containing an electric battery and a latched curved door hinged on said center post for providing when opened access to said compartment, and on/off switch means supported on said center post for turning said generators on and off.

* * * * *